United States Patent
St. John

[15] 3,680,308
[45] Aug. 1, 1972

[54] INTERNAL COMBUSTION TURBINE ENGINE

[72] Inventor: Ward A. St. John, 58 Farland Drive, Newbury Park, Calif. 91320

[22] Filed: June 29, 1970

[21] Appl. No.: 50,572

[52] U.S. Cl..............................60/39.34, 60/39.45
[51] Int. Cl..............................................F02c 3/14
[58] Field of Search..............60/39.34, 39.35, 39.45; 416/20, 21, 22

[56] References Cited

UNITED STATES PATENTS

| | | | |
|---|---|---|---|
| 3,085,399 | 4/1963 | Kitchens | 60/39.35 |
| 3,037,351 | 6/1962 | Stoltz | 60/39.35 |
| 3,557,551 | 1/1971 | Campbell | 60/39.35 |
| 3,005,311 | 10/1961 | Ross | 60/39.35 |
| 2,439,717 | 4/1948 | Cooke | 60/39.34 |
| 2,486,990 | 11/1949 | Sharpe | 60/39.34 |
| 2,709,889 | 6/1955 | Mount | 60/39.35 |
| 3,200,588 | 8/1965 | Math | 60/39.34 |

FOREIGN PATENTS OR APPLICATIONS 1,145,437  3/1963  Germany.....................60/39.34

Primary Examiner—Carlton Croyle
Assistant Examiner—Warren Olsen
Attorney—William H. Maxwell

[57] ABSTRACT

A turbine engine comprised of a driving wheel characterized by a circumferential series of combustion nozzles canted on helically disposed axes thereby to apply torque to said wheel and to discharge burning gases axially; and also comprised of a positive displacement rotary compressor drawing a fuel-air mixture and delivering it under pressure through a tubular drive shaft for centrifugal charging of the combustion nozzle plenums; there being stator and rotor turbine blading utilizing the resulting kinetic energy in the axial and expansive flow of gases also to apply torque to said wheel. Included are unique air starting means and geared drive for use of the engine as a shaft driving prime mover.

23 Claims, 8 Drawing Figures

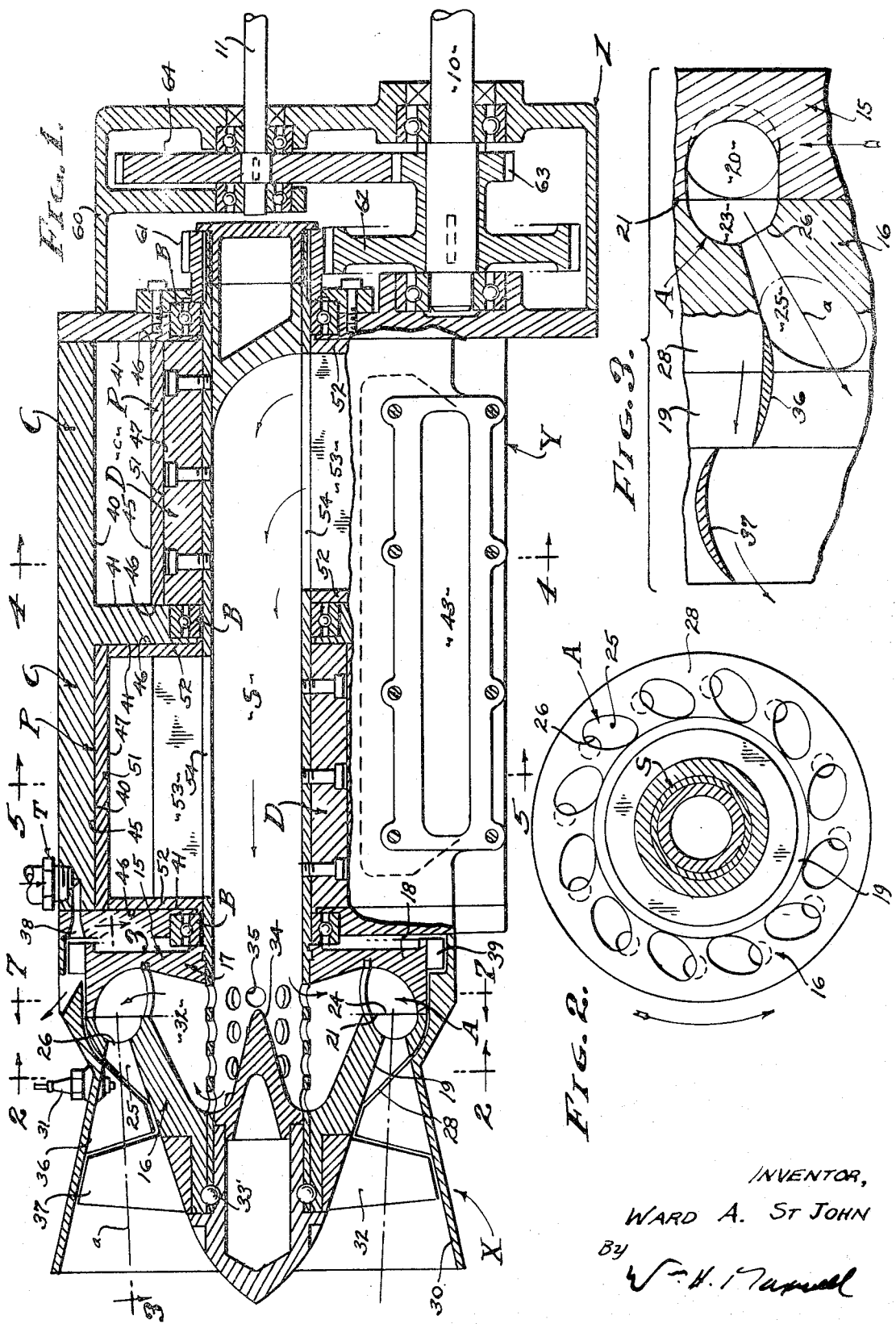
INVENTOR,
WARD A. ST JOHN
BY
J. H. Maxwell

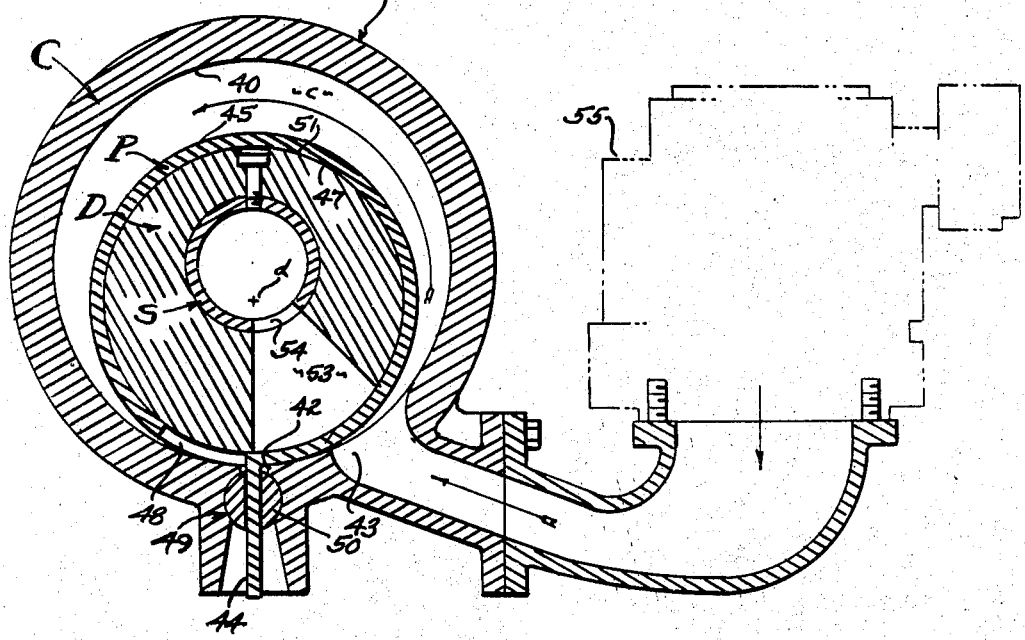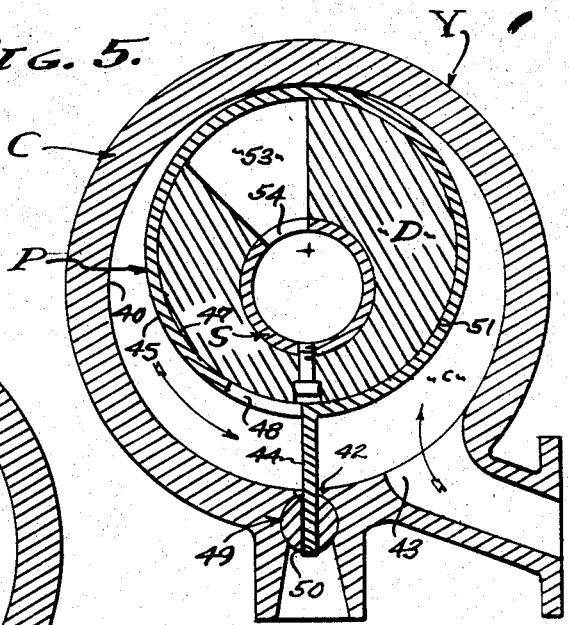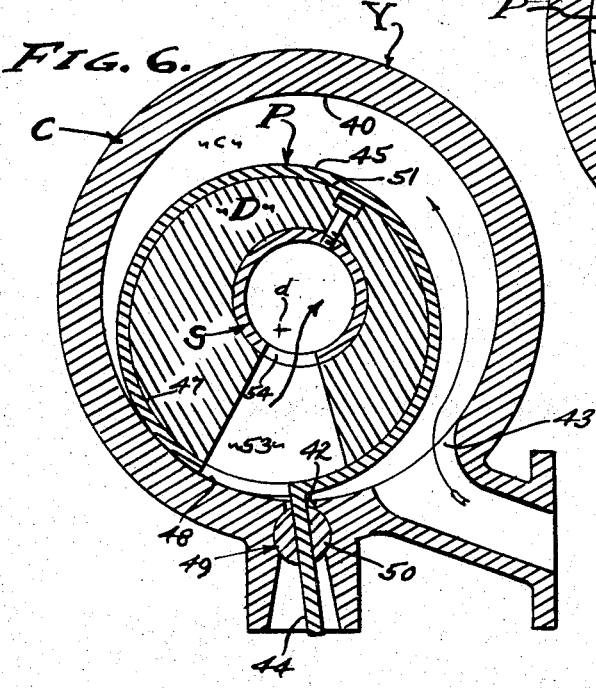

PATENTED AUG 1 1972 3,680,308

INVENTOR,
WARD A. ST JOHN
By
W. H. Maxwell

INTERNAL COMBUSTION TURBINE ENGINE

The engine hereinafter disclosed is essentially of the axial flow type, in that the kinetic energy of burning gases is absorbed in the axial flow thereof. However, the engine is unique in that the induction of a combustible mixture is circumferential and compressed with the application of centripetal forces and charged into combustion nozzles radially and simultaneously compressed with the application of centrifugal forces. Although the turbine section and compressor section are independently operable and/or separately useful, they are herein cooperatively combined so as to fully enhance each other, the turbine section advantageously employing a central induction of combustible mixture in a final centrifugal compression stage, and the compressor section advantageously employing circumferential and centripetal compression with a central axial delivery of compressed fuel-air mixture compatibly useful with the aforementioned turbine section.

Turbine wheels are usually characterized by buckets or blading which react from gases delivered by nozzles fixed in the engine frame. These are for the most part axial flow turbines, referred to as impulse or reaction turbines, or combinations of the two, and as well special types such as re-entry and helical flow turbines. In all usual types of turbines the nozzles are static and the blading or buckets are dynamic and move the wheel. On the contrary, the general concept and unique feature of the present invention is the incorporation therein of the nozzle in the turbine wheel, it being an object to eliminate fixedly positioned combustion chambers and to react against dynamic combustion chambers, all of which are incorporated in the turbine wheel per se.

An object of this invention is to usefully employ combustion nozzles as the prime mover device which propels the turbine wheel and which discharges gases with kinetic energy useful for further work extraction. With the engine hereinafter disclosed, the charge collecting plenums of the combustion nozzles are supplied with a combustible mixture and the nozzles thereof confine the combustion to the rearward of venturi restrictions that separate the plenums and nozzles. The combustion nozzles, or ramjets which they may be called, are canted on helically disposes axes at the periphery of the turbine wheel and each operates as an independent motor.

Another object of this invention is to capture the kinetic energy in moving gases delivered from combustion nozzles, in order to apply torque to a turbine wheel. With the engine hereinafter disclosed, the gases thrust from the combustion nozzles react upon turbine wheel blades that apply torque to a driving shaft. Also, it is an object to employ combustion nozzles as the prime mover device canted helically at the periphery of the turbine wheel and to combine therewith turbine wheel blades upon which the gas thrust from the dynamically moving combustion nozzles react; there being stator blades to redirect the flow of gases with kinetic energy remaining therein for said subsequent reaction.

It is another object of this invention to provide a turbine wheel which incorporates therein the compression of gases and the burning of gases, with an inherent separation of these two functions; the compression function being by means of wheel rotation, and the burning function being by means of a venturi or like restriction separating a plenum of compressed gases from a combustion chamber therefor. With the present invention, the inducted gases are a combustible mixture entering the turbine wheel at or near its center, and thereafter acted upon centrifugally by radially disposed blades. The combustion of gases is by means of combustion nozzles carried in the periphery of the turbine wheel.

It is still another object of this invention to provide a combustion nozzle propelled turbine wheel of the character hereinabove described, wherein the ignition means therefor is stationary while being exposed to the combustion chambers of the plurality of rotatably moving combustion nozzles. With the present invention, the turbine wheel in which the combustion nozzles are formed is conically tapered as it extends rearwardly and consequently truncates the nozzles of the canted combustion nozzles to expose the combustion chambers thereof to the ignition means, a glow plug or the like.

It is also an object of this invention to provide a novel turbine wheel wherein the induction of compressed air is from within the supporting shaft, the column of supply air being revolved prior to entry into said turbine wheel, which is bladed for further centrifugal compression of said supply air.

The various objects and features of this invention will be fully understood from the following detailed description of the typical preferred form and application thereof, throughout which description reference is made to the accompanying drawings, in which:

FIG. 1 is a longitudinal sectional view of the turbine engine.

FIG. 2 is a sectional view of the turbine wheel taken as indicated by line 2—2 on FIG. 1, illustrating the helically canted discharge of the combustion nozzles.

FIG. 3 is an enlarged longitudinal section taken as indicated by line 3—3 on FIG. 1.

FIGS. 4 and 5 are transverse sectional views taken as indicated by lines 4—4 and 5—5 on FIG. 1.

FIG. 6 is a view similar to FIGS. 4 and 5 showing the following rotative gas transferring position.

Figure 7:
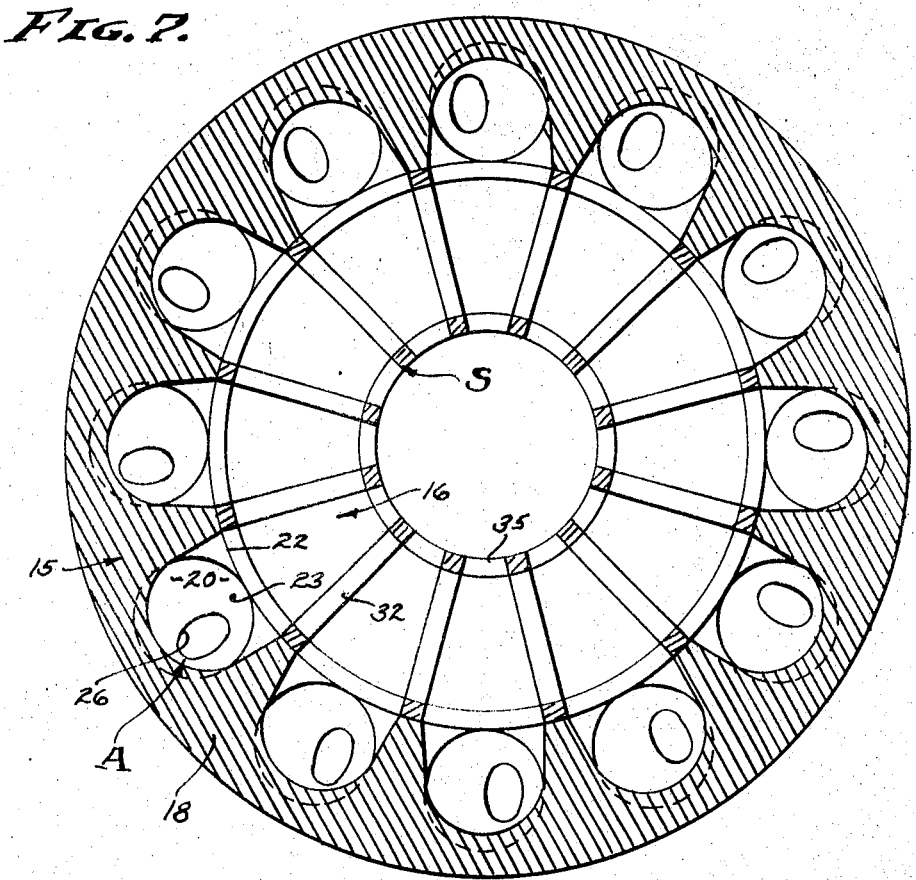

FIG. 7 is an enlarged transverse view taken through the turbine rotor as indicated by line 7—7 on FIG. 1.

Figure 8:
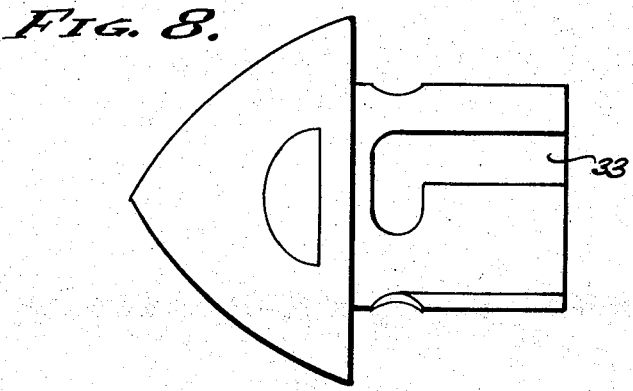

FIG. 8 is a view illustrating the nut which secures the turbine hub to the supporting shaft therefor.

Referring to the drawings, FIG. 1 illustrates a typical embodiment of the turbine engine comprised of a turbine section X, a compressor section Y, and a transmission section Z. Both the turbine section X and compressor section Y are individually unique and are also cooperatively combined; the former being characterized by combustion nozzles canted on helically disposed axes and receiving compressed gases from the latter through a central tubular drive shaft S. The drive shaft S is common to the two sections X and Y and operates power take-off shafts 10 and 11 of the transmission section Z. The fundamental operative cycle of the engine is analogous to the Otto cycle, in that a combustible mixture of gases is compressed and entered into a combustion chamber and ignited therein so as to thermally expand and develop kinetic energy in the form of helically flowing gases. The combustion chambers are within the confines of nozzles disposed on canted axes in the periphery of the turbine wheel, and said nozzles are in the nature of ramjets which are in themselves each a complete and operative motor or prime mover. In its preferred form, the turbine engine is carburated and involves, generally, an intake manifold M circumferentially inducting a combustible mixture into the compressor section Y, ignition means I firing the compressed combustible mixture within the combustion nozzles, starter means T to initiate gas flow and compression through the aforementioned sections X and Y, and various improvements as hereinafter described.

The turbine section X involves a wheel with a plurality of combustion nozzles A carried at the periphery thereof and each disposed on a like helical axis, so that the gases discharged therefrom flow helically for subsequent expansion. In accordance with the invention, the combustion nozzles A are formed integrally in the periphery of the turbine wheel, said wheel being comprised of complementary sections, a flywheel section 15 and an hub section 16. The flywheel section 15 has a disc 17 normal to the rotational axis and has a rim 18 extending radially from the disc to overly and receive the forward end portion of the hub 16. The hub section 16 has a rearwardly tapered expansion cone 19 and its forward end portion incorporates features condusive to the compressive induction of gases into one or more plenums 20 formed in the rim 18 of the flywheel section. In the preferred form there is a separate plenum for each combustion nozzle A, formed by a cavity entering the rearmost normal face 21 of the flywheel and the inner diameter wall 22 of the rim 18. The plenums 20 are adapted to receive the radial flow of compressed gases and to redirect them rearward and axially; and to this end the plenums 20 are elbow-shaped with a mean toroidal radius substantially equal to the cross sectional radius thereof, as shown. The hub section 16 has a complementary hemispherical cavity 23 for each plenum 20, the hub having a face 24 to fit flat against the face 21.

The combustion nozzles A are formed in the aforementioned turbine sections 15 and 16 by providing divergent nozzles 25 opening rearwardly on helically canted axes a. The nozzles 25 are in open communication with the cavities 23, each through a venturi opening 26, with the lower divergencies of the nozzles continuing as a straight line into the rearward convergency of the tapered expansion cone 19. The rear face 28 of the hub section 16 is conically flared radially outward from the contour of cone 19 and thereby truncates the nozzles 25 so as to expose the combustion areas of the nozzles at or near the outermost diameter of the turbine wheel. It is at this proximate point of the combustion nozzle that the ignition means I is provided in the form of a flow plug 31 placed directly in the path of the combustible gases. It is a functional feature of the combustion nozzle that burning is confined to the low pressure combustion area immediately rearward of the venturi restriction and removed from the plenum 20.

In accordance with the invention, the turbine section X controllably confines the helically axial flow of burning gases discharged from the combustion nozzles A, and is characterized by a tail pipe 30 having a divergency continuing in a straight line from the nozzles 25.

Thus, the expansively burning gases emanate from the nozzle 25 and progress continuously throughout the length of the annular between cone 19 and pipe 30, throughout which expansion the resulting kinetic energy can be absorbed.

A feature of the invention is the compressive induction of the combustible mixture by the turbine wheel, and in its preferred form the hub section 16 is provided with radial blading 32 that directs gas flow into the plenums 20 from the tubular gas induction shaft S. The shaft S is journaled on anti-friction bearings B and carries both turbine sections 15 and 16, to rotate together, the latter being attached thereto by a nut with J-slots 33 capturing lock balls 33' and all of which secures the flywheel section 15 in place. A central dividing cone 34 directs combustible (rotating) mixture through perforations 35 in the shaft S, and the blading 32 accelerates the said gases to the plenums 20 where said gases are compressibly confined for discharge through the nozzles 25.

The generation of kinetic energy as caused by the aforementioned rotating combustion nozzles A is absorbed by subsequent stages of turbine blading, a typical example being shown wherein stator blades 36 straighten the flow and second stage rotor blades 37 react to apply torque in order to rotate the turbine wheel in the same direction as initially affected by reaction of the helically canted combustion nozzles.

The starter means T is separate from the foregoing turbine elements and is advantageously incorporated in the periphery of the flywheel section 15. The starter means is preferably by air admitted under pressure through nozzles 38, reacting against radial blading 39 in the outer circumference of the rim 18; a single stage turbine adapted to accelerate the engine to operable speed.

The compressor section Y involves one or more rotor units and each of which is comprised of a cylinder C, a ported sleeve P, and an eccentric drive D; the aforementioned tubular shaft S being projected coaxially through the cylinder C to driveably carry the eccentric drive D and with a port 12 entering therein in register with the porting in the sleeve. In the case illustrated there are two compressor units, 180° displaced, so as to be alternately operable and so that one counterbalances the other; it being understood that various numbers and arrangements of such units can be employed, with suitable counterbalancing. As shown, the two separate pumping units operate and deliver compressed gases into a common central tubular gas induction shaft S.

The cylinder C is a right cylinder that has an inner diameter wall 40 and opposite end walls 41. The tubular shaft S enters concentrically into the cylinder C, preferably passing through openings in both end walls 41 to be journaled in the bearings B at opposite ends of the compressor section. Thus, the cylinder C establishes a pumping chamber c and in accordance with the invention said pumping chamber is partially occupied by the ported sleeve p that is oscillated orbitally therein by means of the eccentric drive D that rotates within said sleeve. The characteristic features of the cylinder C are the longitudinal slot 42 that extends coextensively of the inner diameter wall 40 between the end walls 41, and the induction port 43 which also extends coextensively of the inner diameter wall 40 between the two end walls 41. As best illustrated in FIGS. 4–6, the slot 42 is narrow and adapted to receive a partitioning vane 44 that projects from the ported sleeve P, and the induction port 43 is of substantial circumferential extent, for example 30°, and adapted to pass a combustible mixture into the chamber c. The induction port 43 is positioned to follow the flot 42, a nominal 45°, when considering the same with respect to the direction of rotation of the shaft S and orbital motion of the ported sleeve P.

The ported sleeve P is driven to oscillate orbitally within the chamber C to have touching engagement with or close proximity to the inner diameter wall 40. The ported sleeve P is also a right cylinder, that has an outer diameter wall 45 and opposite normal end walls 46 that slideably engage with the end walls 41 of the cylinder C. In accordance with the invention, the ported sleeve P is substantially smaller in diameter than the inner diameter wall 40 of the chamber c and its contact with or close proximity to the inner diameter wall 40 divides the chamber c, said division being dynamic as the sleeve oscillates. The characteristic features of the ported sleeve P are its shell-like form having an inner diameter bearing wall 47 and compression port 48. The bearing wall 47 rotatably receives the eccentric drive D while the compression port 48 is positioned to precede the aforementioned partitioning vane 44. As shown, the compression port 48 extends substantially coextensively between the ends 46 of the sleeve and for example through a substantial circumferential arc of 30°.

The partitioning vane 44 extends between the ported sleeve P and the cylinder C, so as to establish a head against which gases are compressed and so as to anchor the sleeve against rotation. However, the partitioning vane 44 is articulately joined to one or both (cylinder and sleeve) to permit oscillatory movement of the sleeve, and to this end the vane 44 is shown rigid with the sleeve P and slideably engaged through a seal 49 in the cylinder slot 42. As illustrated, the seal 49 is comprised of semi-circular bars 50 having concentrically curved surfaces rotatably engaged with complementary opposed faces. The seal 49 permits radial displacement as well as angular displacement of the partitioning vane 44.

The eccentric drive D is a right angular cylinder that occupies the interior of the ported sleeve P and which has an outer bearing wall 51 rotatably engageable with the bearing wall 47 and which has opposite normal end walls 52 in planes coincidental with the walls 46 respectively, and likewise slideably engageable with the end walls 41 of the cylinder C. The axis d of the drive is positioned eccentrically from the axis of shaft S a radial distance to control the orbital motion of the ported sleeve. As shown, the body of the eccentric drive D is fastened to the shaft S to rotate therewith and the eccentric body and driving shaft S are provided with a transfer port 53–54 positioned ahead of or in advance (with respect to direction of rotation) of the major radius of eccentric body and extending through an arc of 45°, for example, radiating from the center of rotation. The transfer ports 53–54 extend substantially coextensively between the end walls 52, a feature being the circumferential continuity of said walls 52 (see FIG. 1).

From the foregoing it will be seen that the turbine section X and compressor section Y are cooperatively combined so as to advantageously create and employ a central flow induction of combustible mixture. A carburetor 55 supplies the combustible mixture to the induction port 43 and which enters into the cylinder chamber c as clearly illustrated in FIGS. 4, 5 and 6. In FIG. 4 the chamber c is filled with combustible mixture, and following which approximately 45° of rotation will close the port 43, to be followed by the subsequent compression and next following induction shown in FIG. 5. The initial ratio of compression approaches two to one, and rotation to the delivery position shown in FIG. 6 moves the compressed mixture through the compression port 48 and transfer ports 53–54. It is to be observed that the ports 53–54 are rotationally in advance of the major radius of the eccentric and thereby open the chamber c into the tubular induction shaft S, to be followed by complete displacement of mixture from the diminished chamber c. After said complete displacement, the ports 53–54 close the compression port 48 in order to isolate the ported sleeve P from other such units and to the end that a plurality of such units are cooperatively combined on a common tubular induction shaft S for additive positive displacement.

The transmission means Z involves a case 60 attached to the end of the compressor section Y, there being a drive pinion 61 meshed with a drive gear 62 to revolve the main output shaft 10. A drive pinion 63 of said output shaft meshes with a driven gear 64 on a secondary shaft 11; all of which are journaled on suitable bearings, as shown.

Having described only a typical preferred form and application of my invention, I do not wish to be limited or restricted to the specific details herein set forth, but wish to reserve to myself any modifications or variations that may appear to those skilled in the art.

Having described my invention, I claim:

1. An internal combustion engine for burning a combustible mixture and comprising: a turbine section including a rotatable wheel with a series of helically canted combustion nozzles carried at and to discharge burning gases at the periphery thereof, means directing the flow of combustible gases from the center of the wheel to a plenum of each combustion nozzle; a positive displacement compressor section including, a cylinder with a peripheral induction port in open communication with an intake manifold supplying the combustible mixture, a ported sleeve orbitally operable within said cylinder to draw the combustible mixture circumferentially therethrough, a partitioning vane articulately extending between the ported sleeve and surrounding cylinder, and an eccentric drive having bearing engagement within the ported sleeve to orbitally oscillate said sleeve within said cylinder, and a tubular shaft revolving the eccentric drive and in open communication with the means directing the flow of combustible gases from the center of the wheel, there being a transfer port through said eccentric drive and opening into said tubular shaft for inducting compressed gases into the turbine section at the center of the wheel thereof.

2. The engine for burning combustible mixture as set forth in claim 1 and wherein the cylinder, ported sleeve and eccentric drive are each a right cylinder, the said cylinder having an inner diameter wall and opposite end walls, the said ported sleeve having an outer diameter wall smaller in dimension than said inner diameter wall and with opposite end walls slideably engageable with the end walls of the cylinder, and the eccentric drive having end walls slideably engageable with the end walls of the cylinder.

3. The engine for burning combustible mixture as set forth in claim 1, wherein and relative to the direction of rotation, the induction port into the cylinder follows the partitioning vane, wherein the ported sleeve has a compression port preceding the partitioning vane, and wherein the transfer port through the eccentric drive and into the tubular shaft is rotatably in advance of the major diameter thereof.

4. The engine for burning combustible mixture as set forth in claim 1, wherein the cylinder, ported sleeve and eccentric drive are each a right cylinder, the said cylinder having an inner diameter wall and opposite end walls, the said ported sleeve having an outer diameter wall smaller in dimension than said inner diameter wall and with opposite end walls slideably engageable with the end walls of the cylinder, and the eccentric drive having end walls slideably engageable with the end walls of the cylinder, and wherein the ports in the cylinder ported sleeve and eccentric drive extend coextensively between the opposite end walls thereof respectively.

5. The engine for burning combustible mixture as set forth in claim 1 wherein the cylinder, ported sleeve and eccentric drive are each a right cylinder, the said cylinder having an inner diameter wall and opposite end walls, the said ported sleeve having an outer diameter wall smaller in dimension than said inner diameter wall and with opposite end walls slideably engageable with the end walls of the cylinder, and the eccentric drive having end walls slideably engageable with the end walls of the cylinder, wherein and relative to direction of rotation, the induction port into the cylinder follows the partitioning vane and the ported sleeve has a compression port preceding the partitioning vane, and wherein the transfer port through the eccentric drive and into the tubular shaft is rotatably in advance of the major diameter thereof, and wherein the ports in the cylinder, ported sleeve and eccentric drive extend coextensively between the opposite end walls thereof respectively.

6. The engine for burning combustible mixture as set forth in claim 1 and wherein the partitioning sleeve projects radially from the ported sleeve and is slideably engaged in a rotating seal carried in the cylinder wall.

7. The engine for burning combustible mixture as set forth in claim 1 wherein and relative to direction of rotation, the induction port in the cylinder follows the partitioning vane a nominal 45° and a substantial arcuate portion thereof being open and the ported sleeve has a compression port preceding the partitioning vane and open through a nominal arc of 30°, and wherein the transfer port through the eccentric drive and into the tubular shaft is open rotatably in advance of the major diameter thereof a nominal 45°.

8. The engine for burning combustible mixture as set forth in claim 1 wherein the cylinder, ported sleeve and eccentric drive are each a right cylinder, the said cylinder having an inner diameter wall and opposite end walls, the said ported sleeve having an outer diameter wall smaller in dimension than said inner diameter wall and with opposite end walls slideably engageable with the end walls of the cylinder, and the eccentric drive having end walls slideably engageable with the end walls of the cylinder, wherein and relative to direction of rotation, the induction port in the cylinder follows the partitioning vane a nominal 45° and a substantial arcuate portion thereof being open and the ported sleeve has a compression port preceding the partitioning vane and open through a nominal arc of 30°, and wherein the transfer port through the eccentric drive and into the tubular shaft is open rotatably in advance of the major diameter thereof a nominal 45°.

9. The engine for burning combustible mixture as set forth in claim 1, wherein the combustion nozzles have divergently flared nozzles for expansion of the burning gases, said divergency continuing into the outside diameter of a concentric tail cone and into the inside diameter of a concentrically surrounding tail pipe, wherein the combustion nozzles are formed in the said wheel having a forwardly and outwardly flared rear face and with the nozzle openings thereof truncated, wherein ignition means is fixedly positioned adjacent the outer diameter of said flared rear face for exposing the combustion areas of the combustion nozzles thereto, wherein the burning gases from the combustion nozzles are straightened to flow axially by stators and the kinetic energy of said burning gases is absorbed by a subsequent rotor stage of the turbine section, wherein the means directing the flow of combustible gases from the center of the wheel includes radially disposed blades on said wheel centrifugally compressing the combustible mixture, and wherein the rotatable wheel of the turbine section is journaled upon a tubular shaft receiving the compressed combustible mixture from the compressor section, said tubular shaft being radially open into said means directing the flow of combustible gases from the center of the wheel to the combustion nozzle plenums.

10. The engine for burning combustible mixture as set forth in claim 1, wherein the combustion nozzles have divergently flared nozzles for expansion of the burning gases, said divergency continuing into the outside diameter of a concentric tail cone and into the inside diameter of a concentrically surrounding tail pipe, wherein the combustion nozzles are formed in the said wheel having a forwardly and outwardly flared rear face and with the nozzle openings thereof truncated, wherein ignition means is fixedly positioned adjacent the outer diameter of said flared rear face for exposing the combustion areas of the combustion nozzles thereto, wherein the burning gases from the combustion nozzles are straightened to flow axially by stators and the kinetic energy of said burning gases is absorbed by a subsequent rotor stage of the turbine section, wherein the means directing the flow of combustible gases from the center of the wheel includes radially disposed blades on said wheel centrifugally compressing the combustible mixture, wherein the rotatable wheel of the turbine section is journaled upon a tubular shaft receiving the compressed combustible mixture from the compressor section, said tubular shaft being radially open into said means directing the flow of combustible gases from the center of the wheel to the combustion nozzle plenums, wherein the cylinder, ported sleeve and eccentric drive are each a right cylinder, the said cylinder having an inner diameter wall and opposite end walls, the said ported sleeve having an outer diameter wall smaller in dimension than said inner diameter wall and with opposite end walls slideably engageable with the end walls of the cylinder, and the eccentric drive having end walls slideably engageable with the end walls of the cylinder, wherein and relative to direction of rotation, the induction port in the cylinder follows the partitioning vane a nominal 45° and a substantial arcuate portion thereof being open and the ported sleeve has a compression port preceding the partitioning vane and open through a nominal arc of 30°, and wherein the transfer port through the eccentric drive and into the tubular shaft is open rotatably in advance of the major diameter thereof a nominal 45°.

11. A rotatable turbine wheel characterized by a series of helically canted combustion nozzles integrally formed in and to discharge burning gases at the periphery thereof, and including, a disc-shaped flywheel section having a rearwardly extending rim overlying the forward end portion of a rearwardly extended hub section, the combustion nozzle plenums being formed in the said rim and the nozzles thereof being formed in the said hub section fitted onto the flywheel section to close said plenums, and a flow passage between the flywheel section and the hub section from the center of the wheel to the plenum of each combustion nozzle.

12. The turbine wheel as set forth in claim 11 wherein the plenums are elbow-shaped, opening radially inward and axially rearward from the said rim of the flywheel.

13. The turbine wheel as set forth in claim 11 wherein the plenums are elbow-shaped with a mean toroidal radius substantially equal to the cross sectional radius thereof, and opening radially inward and axially rearward from the said rim of the flywheel section.

14. The turbine wheel as set forth in claim 11 wherein a hemispherical cavity is formed in the hub section complementary with each plenum to close the same.

15. The turbine wheel as set forth in claim 11 wherein a hemispherical cavity is formed in the hub section complementary with each plenum to close the same, and wherein a rearwardly flared nozzle is in open communication into each plenum through a restricted opening in the hemispherical cavity.

16. The turbine wheel as set forth in claim 11 wherein the flow passage between the flywheel section and hub section includes radial blading centrifugally driving gases into the plenums.

17. The turbine wheel as set forth in claim 11 wherein the plenums are elbow-shaped, opening radially inward and axially rearward from said rim of the flywheel section, and wherein a hemispherical cavity is formed in the hub section complementary with each plenum to close the rearward opening thereof.

18. The turbine wheel as set forth in claim 11 wherein the plenums are elbow-shaped, opening radially inward and axially rearward from said rim of the flywheel section, wherein a hemispherical cavity is formed in the hub section complementary with each plenum to close the rearward opening thereof, and wherein a rearwardly flared nozzle is in open communication into each plenum through a restricted opening in the hemispherical cavity.

19. The turbine wheel as set forth in claim 11 wherein the plenums are elbow-shaped, opening radially inward and axially rearward from said rim of the flywheel section, wherein a hemispherical cavity is formed in the hub section complementary with each plenum to close the rearward opening thereof, wherein a rearwardly flared nozzle is in open communication into each plenum through a restricted opening in the hemispherical cavity, and wherein the flow passage between the flywheel section and hub section includes radial blading centrifugally driving gases into the plenums.

20. An internal combustion engine for burning a combustible mixture and comprising: a combustible mixture supply means; a turbine section including, a rotatable wheel having a forwardly and outwardly flared rear face with a series of truncated helically canted combustion nozzles carried at and to discharge burning gases at the periphery of the wheel, duct means directing the flow of combustible gases from the center of the wheel to a plenum of each combustion nozzle, and ignition means fixedly positioned adjacent the outer diameter of said flared rear face for exposing the combustion areas of the combustion nozzles; and a compressor section including, a rotary element and compressing the combustible mixture received from said supply means and through an intake manifold and discharging the same into said duct means at the center of the wheel, and drive means transmitting torque from the rotatable wheel of the turbine section to the rotary element of the compressor section.

21. The engine for burning combustible mixture as set forth in claim 20, wherein the combustion nozzles have divergently flared nozzle openings for expansion of the burning gases, said divergency continuing into the outside diameter of a concentric tail cone and into the inside diameter of a concentrically surrounding tail pipe, wherein the burning gases from the combustion nozzles are straightened to flow axially be stators and the kinetic energy of said burning gases is absorbed by a subsequent rotor stage of the turbine section, wherein the duct means directing the flow of combustible gases from the center of the wheel includes radially disposed blades on said wheel centrifugally compressing the combustible mixture, and wherein the rotatable wheel of the turbine section is journaled upon a tubular shaft receiving the compressed combustible mixture from the compressor section, said tubular shaft being radially open into said duct means directing the flow of combustible gases from the center of the wheel to the combustion nozzle plenums.

22. A turbine prime mover comprising: a combustible mixture supply means, a rotatable wheel having a forwardly and outwardly flared rear face and having a central duct means in open communication with said supply means and with a series of truncated and helically canted combustion nozzles with openings for discharging the burning gases at the periphery thereof, radially disposed passages in said wheel directing the flow of combustible gases from said duct means of the wheel to a plenum of each combustible nozzle, and ignition means fixedly positioned adjacent the outer diameter of said flared rear face for exposing the combustion areas of the combustion nozzles thereto.

23. The turbine prime mover as set forth in claim 22, wherein the combustion nozzles have divergently flared nozzle openings for expansion of the burning gases, said divergency continuing into the outside diameter of a concentric tail cone and into the inside diameter of a concentrically surrounding tail pipe, wherein the burning gases from the combustion nozzles are straightened to flow axially by stators and the kinetic energy of said burning gases is absorbed by a subsequent rotor stage of the turbine, wherein the duct means directing the flow of combustible gases from the center of the wheel includes radially disposed blades on said wheel centrifugally compressing the combustible mixture, and wherein the rotatable wheel of the turbine is journaled upon a tubular shaft receiving combustible mixture, said tubular shaft being radially open into said duct means directing the flow of combustible gases from the center of the wheel to the combustion nozzle plenums.

* * * * *